US012592476B2

(12) United States Patent
Lee et al.

(10) Patent No.: US 12,592,476 B2
(45) Date of Patent: Mar. 31, 2026

(54) CIRCUIT BOARD FOR ANTENNA, ANTENNA PACKAGE INCLUDING THE SAME AND IMAGE DISPLAY DEVICE INCLUDING THE SAME

(71) Applicant: DONGWOO FINE-CHEM CO., LTD., Jeollabuk-do (KR)

(72) Inventors: Won Hee Lee, Gyeonggi-do (KR); Na Yeon Kim, Seoul (KR); Dae Kyu Kim, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 288 days.

(21) Appl. No.: 18/196,063

(22) Filed: May 11, 2023

(65) Prior Publication Data

US 2023/0369745 A1 Nov. 16, 2023

(30) Foreign Application Priority Data

May 13, 2022 (KR) ........................ 10-2022-0059035

(51) Int. Cl.
*H01Q 1/24* (2006.01)
*H01Q 1/48* (2006.01)
*H01Q 9/04* (2006.01)
*H01Q 21/08* (2006.01)

(52) U.S. Cl.
CPC ............... *H01Q 1/243* (2013.01); *H01Q 1/48* (2013.01); *H01Q 9/045* (2013.01); *H01Q 21/08* (2013.01)

(58) Field of Classification Search
CPC ............ H01Q 1/243; H01Q 1/48; H01Q 1/38; H01Q 1/44; H01Q 1/46; H01Q 9/045; H01Q 21/08
See application file for complete search history.

(56) References Cited

U.S. PATENT DOCUMENTS

2019/0044224 A1* 2/2019 Kim ......................... H01Q 7/00
2022/0302573 A1* 9/2022 Choi ........................ H01Q 1/48
2023/0006349 A1* 1/2023 Lee ........................ H01Q 21/24
2024/0072410 A1* 2/2024 Rehnström .............. H01Q 1/42

FOREIGN PATENT DOCUMENTS

CN 218827797 U * 4/2023 ............... H01Q 1/38
KR 10-2019-0009232 A 1/2019
KR 20200112793 A * 10/2020 ........... H04M 1/026
KR 10-2190809 B1 12/2020

* cited by examiner

*Primary Examiner* — Seokjin Kim
(74) *Attorney, Agent, or Firm* — The PL Law Group, PLLC

(57) ABSTRACT

A circuit board for an antenna according to an embodiment includes a core layer having a first surface and second surface that face each other, a second conductive layer disposed on the second surface of the core layer, and a first conductive layer disposed on the first surface of the core layer. The first conductive layer includes signal wirings, and a co-planar ground spaced apart from the signal wirings in a horizontal direction. The co-planar ground includes a first recess formed between end portions of neighboring signal wirings of the signal wirings.

19 Claims, 7 Drawing Sheets

CIRCUIT BOARD FOR ANTENNA, ANTENNA PACKAGE INCLUDING THE SAME AND IMAGE DISPLAY DEVICE INCLUDING THE SAME

PRIORITY

This application claims the benefit under 35 USC § 119 of Korean Patent Application No. 10-2022-0059035 filed on May 13, 2022, in the Korean Intellectual Property Office, the entire disclosure of which is incorporated herein by reference for all purposes.

BACKGROUND

1. Field

The present invention relates to a circuit board for an antenna, an antenna package including the same and an image display device including the same. More particularly, the present invention relates to a circuit board for an antenna including a feeding circuit wiring, an antenna package including the same and an image display device including the same.

2. Description of the Related Art

As information technologies have been developed, a wireless communication technology such as Wi-Fi, Bluetooth, etc., is combined with an image display device in, e.g., a smartphone form. In this case, an antenna may be combined with the image display device to provide a communication function.

Recently, as mobile communication technologies has been developed, an antenna for a communication in a high frequency or an ultra-high frequency band is needed in the image display device.

To increase sensitivity and gain of a radiator included in an antenna, the radiator may be disposed within a display area of a front side of the image display device. Additionally, a length of a transmission line connected to the radiator and disposed in a bezel area may be reduced so as to reduce a signal loss transmitted to the radiator.

In this case, the radiator may be adjacent to the bezel area where a circuit connection is implemented. Accordingly, antenna radiation properties from the radiator may be disturbed by an electrical interference in the bezel area.

Further, as a frequency band of the antenna is shifted to, e.g., the high frequency or ultra-high frequency band of 20 GHz or more, a signal/frequency disturbance may occur even by a small electrical interference.

SUMMARY

According to an aspect of the present invention, there is provided a circuit board for an antenna providing improved radiation property and electrical reliability.

According to an aspect of the present invention, there is provided an antenna package including a circuit board for an antenna that provides improved radiation property and electrical reliability.

According to an aspect of the present invention, there is provided an image display device including the antenna package.

(1) A circuit board for an antenna, including a core layer having a first surface and second surface that face each other; a second conductive layer disposed on the second surface of the core layer; and a first conductive layer disposed on the first surface of the core layer, wherein the first conductive layer includes: signal wirings; and a co-planar ground spaced apart from the signal wirings in a horizontal direction, the co-planar ground including a first recess formed between end portions of neighboring signal wirings of the signal wirings.

(2) The circuit board for an antenna of the above (1), wherein the co-planar ground includes a first portion adjacent to front end portions of the signal wirings and a second portion adjacent to rear end portions of the signal wirings, and the first portion includes partial cut grounds divided by the first recess.

(3) The circuit board for an antenna of the above (2), wherein a length of each of the partial cut grounds is equal to or greater than half a wavelength of a resonance frequency.

(4) The circuit board for an antenna of the above (2), wherein a ratio of a width of the signal wiring to a width of the partial cut ground is in a range from 3 to 5.

(5) The circuit board for an antenna of the above (2), wherein the front end portions of the signal wirings serve as feeding portions, and the rear end portions of the signal wirings serve as external circuit connecting portions.

(6) The circuit board for an antenna of the above (5), further including a connector connected to the external circuit connection portions.

(7) The circuit board for an antenna of the above (2), wherein the second conductive layer overlaps the second portion of the co-planar ground in a thickness direction and does not overlap the first portion of the co-planar ground.

(8) The circuit board for an antenna of the above (7), wherein the second conductive layer overlaps the rear end portions of the signal wirings in the thickness direction and does not overlap the front end portions of the signal wirings.

(9) The circuit board for an antenna of the above (2), wherein the second conductive layer includes a third portion overlapping the first portion of the co-planar ground, and a fourth portion overlapping the second portion of the co-planar ground.

(10) The circuit board for an antenna of the above (9), wherein the third portion of the second conductive layer has a second recess overlapping the first recess in a plan view.

(11) The circuit board for an antenna of the above (9), wherein the second conductive layer entirely covers the signal wirings in a plan view.

(12) The circuit board for an antenna of the above (2), wherein the signal wirings have bent portions connecting the front end portions and the rear end portions.

(13) The circuit board for an antenna of the above (2), wherein end portions of the partial cut grounds have a curved shape.

(14) An antenna package, including: a plurality of antenna units each including a radiator and a transmission line connected to the radiator; and the circuit board for an antenna according to the above-describe embodiments electrically connected to the antenna units.

(15) The antenna package of the above (14), wherein the transmission line includes a first branch portion and a second branch portion extending in different directions from the radiator, and the signal wirings include a first signal wiring electrically connected to the first branch portion, and a second signal wiring electrically connected to the second branch portion.

(16) The antenna package of the above (15), wherein the first recess is disposed between the first signal wiring and the second signal wiring.

(17) An image display device, including: a display panel; an antenna unit disposed on the display panel; and the circuit board for an antenna according to the above-described embodiments electrically connected to the antenna unit.

(18) The image display device of the above (17), wherein the circuit board for an antenna is bent under the display panel.

A circuit board for an antenna according to embodiments of the present invention may include a co-planar ground and a vertical ground formed on a first surface and a second surface of the core layer, respectively. The vertical ground and the co-planar ground may be distributed together around a signal wiring, so that noise absorption/removal and feeding efficiency may be efficiently improved.

In exemplary embodiments, the co-planar ground may be partially cut by a recess between neighboring signal wirings. Accordingly, coupling and electric field interference occurring between metal layers of the antenna device and the circuit board coupled to the antenna device in a bonding region may be reduced or suppressed.

In some embodiments, the vertical ground may be removed on feeding portions of the signal wiring, or may include a recess substantially the same as or similar to the co-planar ground. Accordingly, coupling and electric field interference in the bonding region may be further reduced.

DETAILED DESCRIPTION OF THE EMBODIMENTS

According to embodiments of the present invention, a circuit board for an antenna including a ground and a signal wiring is provided. Additionally, an antenna package and an image display device including the antenna circuit board are provided.

In exemplary embodiments, a radiator of the antenna package may be disposed in a display area of the image display device. Accordingly, the antenna package may be provided as an antenna package for an AOD (Antenna-On Display).

In some embodiments, the antenna package may be manufactured in the form of a microstrip patch combined with an antenna device. The antenna device or the antenna package may be applied to a communication device for, e.g., 3G, 4G, 5G or higher high-frequency or ultra-high frequency mobile communication.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "first", "second", "upper", "lower", "top", "bottom", etc., used herein do not designate an absolute position, but are relatively used to distinguish different elements or different positions.

Figure 1:
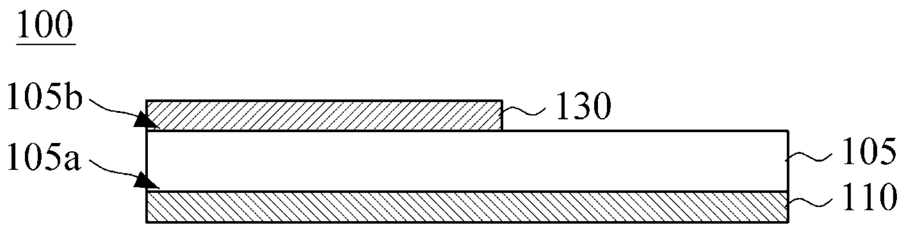
FIG. 1 is a schematic cross-sectional view illustrating a circuit board for an antenna in accordance with exemplary embodiments.
Figure 2:
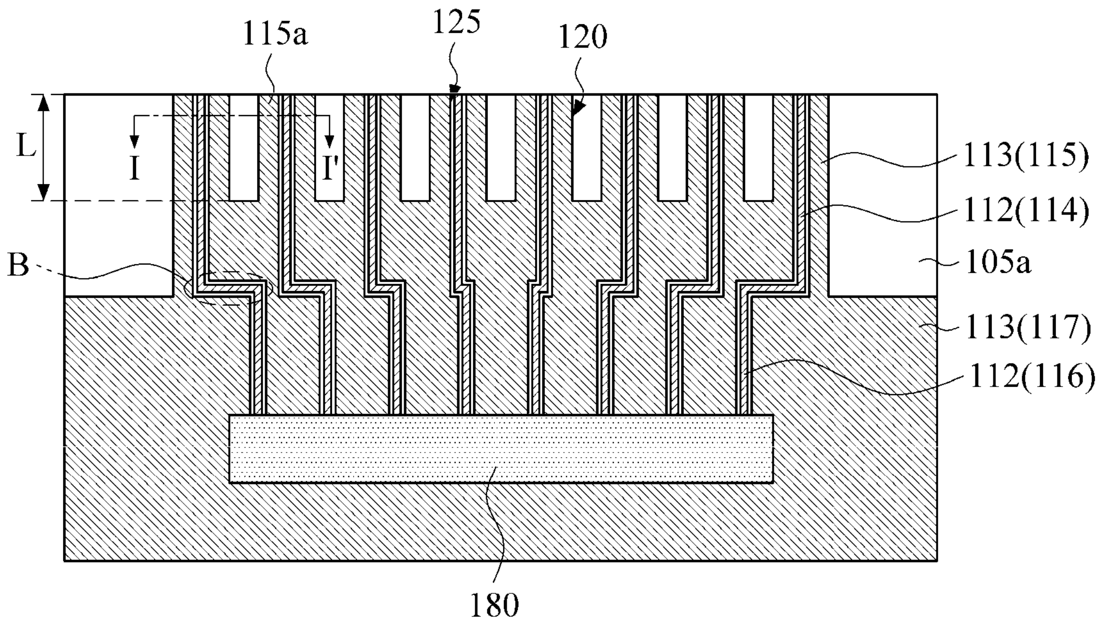
FIGS. 2 and 3 are schematic plan views illustrating a circuit board for an antenna in accordance with exemplary embodiments.
Figure 3:
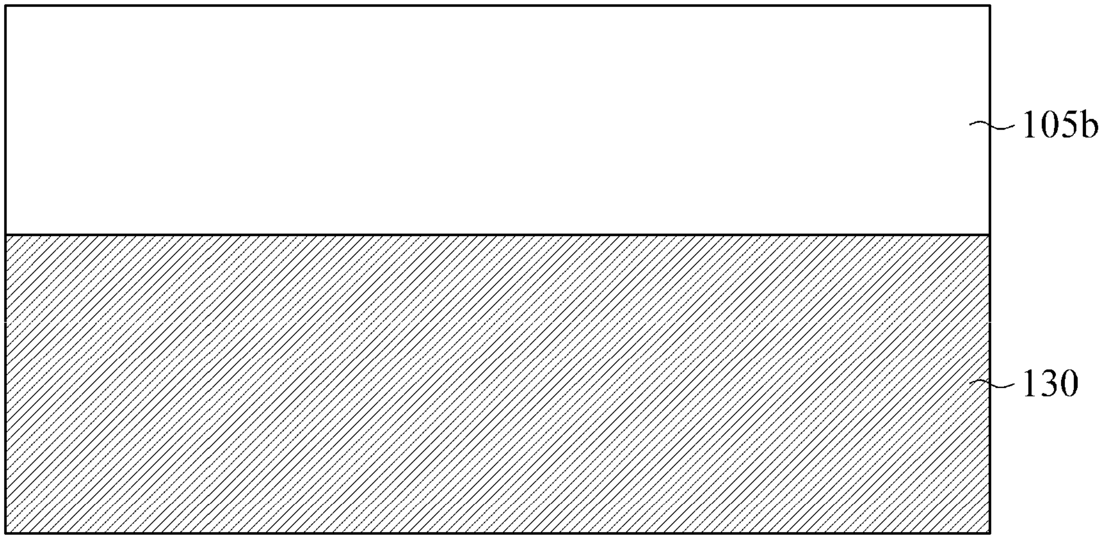
Figure 4:
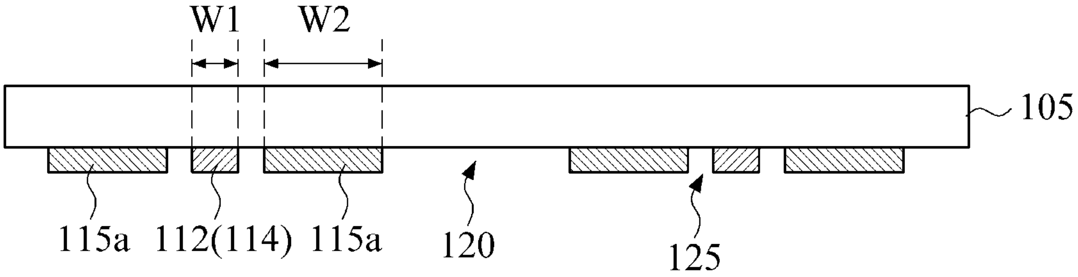
FIG. 4 is a schematic cross-sectional view illustrating a circuit board for an antenna in accordance with exemplary embodiments.

FIG. 1 is a schematic cross-sectional view illustrating a circuit board for an antenna in accordance with exemplary embodiments. FIGS. 2 and 3 are schematic plan views illustrating a circuit board for an antenna in accordance with exemplary embodiments. FIG. 4 is a schematic cross-sectional view illustrating a circuit board for an antenna in accordance with exemplary embodiments.

For example, FIGS. 2 and 3 are plan views from a first surface 105*a* and a second surface 105*b* of a core layer 105, respectively. FIG. 4 is a cross-sectional view taken along a line I-I' of FIG. 2 in a thickness direction.

Referring to FIG. 1, a circuit board 100 for an antenna (hereinafter, that may be abbreviated as a circuit board) may include the core layer 105, a first conductive layer 110 and a second conductive layer 130. In exemplary embodiments, the circuit board 100 may be provided as a flexible printed circuit board (FPCB).

The core layer 105 may serve as an insulating substrate of the circuit board 100. For example, the core layer 105 may include a flexible resin such as a polyimide resin, modified polyimide (MPI), an epoxy resin, polyester, a cyclo olefin polymer (COP), a liquid crystal polymer (LCP), etc. The core layer 105 may include an internal insulating layer included in the circuit board 100.

The core layer 105 may include the first surface 105*a* and the second surface 105*b*. The first surface 105*a* and the second surface 105*b* may face each other and may correspond to bottom and top surfaces of the core layer 105, respectively.

In exemplary embodiments, the first surface 105*a* of the core layer 105 may provide an adhering surface or a bonding surface with the antenna device.

The first conductive layer 110 and the second conductive layer 130 may be disposed on the first surface 105*a* and the second surface 105*b* of the core layer 105, respectively. The first conductive layer 110 and the second conductive layer 130 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), or an alloy containing at least one of the metals. These may be used alone or in combination of two or more therefrom.

For example, each of the first conductive layer 110 and the second conductive layer 130 may include copper or a copper alloy.

Referring to FIG. 2, the first conductive layer 110 may be disposed on the first surface 105*a* of the core layer 105, and may include a co-planar ground 113 and a signal wiring 112.

The signal wiring 112 may serve as a feeding/signal transfer wiring to the antenna device. The signal wiring 112 may include a feeding portion 114 and an external circuit connecting portion 116.

The external circuit connecting portion 116 may correspond to a rear end portion of the signal wiring 112, and may be connected to an antenna driving integrated circuit (IC) chip to receive feeding and control signals for driving the antenna. In some embodiments, a terminal end portion of the external circuit connecting portion 116 may be coupled to a connector 180. The signal wiring 112 may be electrically connected to the antenna driving IC chip through the connector 180.

The feeding portion 114 may correspond to a front end portion of the signal wiring 112 and may be electrically connected to the antenna device. Accordingly, the feeding and control signals input from the external circuit connecting portion 116 may be transferred to the antenna device through the feeding portion 114. For example, a terminal end portion of the feeding portion 114 may be bonded to the antenna device.

In some embodiments, the feeding portion 114 and the external circuit connecting portion 116 may be integrally connected to each other via a bent portion B. For example, a plurality of the signal wirings 112 may be arranged along a width direction of the circuit board 100. The external circuit connecting portion 116 of the signal wirings 112 may be connected to the connector 180 with an increased wiring density by the bent portion B.

The co-planar ground 113 may be disposed at the same layer as that of the signal wirings 112, and may be physically separated/spaced from the signal wirings 112 in the width direction. For example, the co-planar ground 113 may be physically separated from the signal wiring 112 by an isolation region 125.

In exemplary embodiments, the co-planar ground 113 may be disposed at both sides of one signal wiring 112. Accordingly, one signal wiring 112 may be sandwiched by the co-planar ground 113. Thus, a co-planar waveguide (CPW) structure may be implemented, so that noises around the signal wiring 112 may be absorbed and blocked, and a feeding efficiency and concentration to the antenna device through the signal wiring 112 may be improved.

The co-planar ground 113 may include a first portion 115 and a second portion 117. The first portion 115 may be disposed around the feeding portion 114 of the signal wiring 112. The second portion 117 may be disposed around the external circuit connecting portion 116 of the signal wiring 112.

In exemplary embodiments, the first portion 115 may include a recess 120. The recess 120 may be formed between the feeding portions 114 of neighboring signal wirings 112. Accordingly, the first portion 115 may be divided along the width direction by the recess 120 between the neighboring feeding portions 114.

The recess 120 and the isolation region 125 may be an etched region or a cut region of the conductive layer.

For example, the first portion 115 may include a partial cut ground 115*a* formed by the recess 120. Front end portions of the feeding portions 114 may be sandwiched by the partial cut grounds 115*a*.

In some embodiments, a length of the partial cut ground 115*a* or a length of the recess 120 may be equal to or greater than half a wavelength (λ/2) of a resonance frequency of the antenna package or the antenna device to which the circuit board 100 is applied. Preferably, the length of the partial cut ground 115*a* or the length of the recess 120 may be adjusted within a range from half a wavelength (λ/2) to one wavelength (λ).

Within the above range, independence and signal reliability of each feeding portion 114 may be further improved by the recess 120.

Referring to FIG. 3, the second conductive layer 130 may be disposed on the second surface 105*b* of the core layer 105. In exemplary embodiments, the second conductive layer 130 may serve as a vertical ground for the signal wiring 112.

The second conductive layer 130 may overlap a plurality of the external circuit connecting portions 116 in a vertical direction or the thickness direction, and may serve as a common vertical ground for the external circuit connecting portions 116. The second conductive layer 130 may also overlap the second portion 117 of the co-planar ground 113 in the vertical direction.

Accordingly, an electric field may be generated by an interaction of the first and second conductive layers 110 and 130 within the core layer 105, so that feeding/driving signal from the external circuit connecting portion 116 may be promoted in a direction to the feeding portion 114.

In some embodiments, the second conductive layer 130 may not overlap the first portion 115 of the co-planar ground 113 in the vertical direction. In some embodiments, the second conductive layer 130 may not overlap the feeding portion 114 of the signal wiring 112.

Referring to FIG. 4, as described above, the first portion 115 of the co-planar ground 113 may be separated by the recess 120 to form the partially cut ground 115*a*.

Accordingly, an amount of the conductive layer or the conductive material in the bonding region with the antenna device may be reduced, and a coupling of the conductive layers generated in the bonding region may be reduced or suppressed.

Additionally, the second conductive layer 130 serving as the vertical ground in the bonding region may be removed to further suppress the coupling.

In some embodiments, a ratio of a width W2 of the partial cut ground 115*a* to a width W1 of the signal wiring 112 or the feeding portion 114 may be in a range from 3 to 5. Within the above range, the coupling in the bonding region may be sufficiently reduced while achieving the CPW effect around the feeding portion 114.

Figure 5:
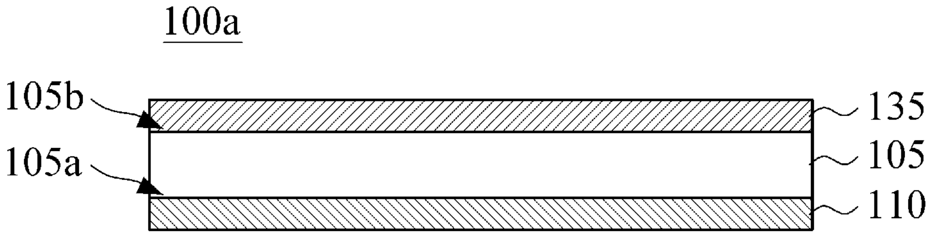
FIG. 5 is a schematic cross-sectional view illustrating a circuit board for an antenna in accordance with exemplary embodiments.
Figure 6:
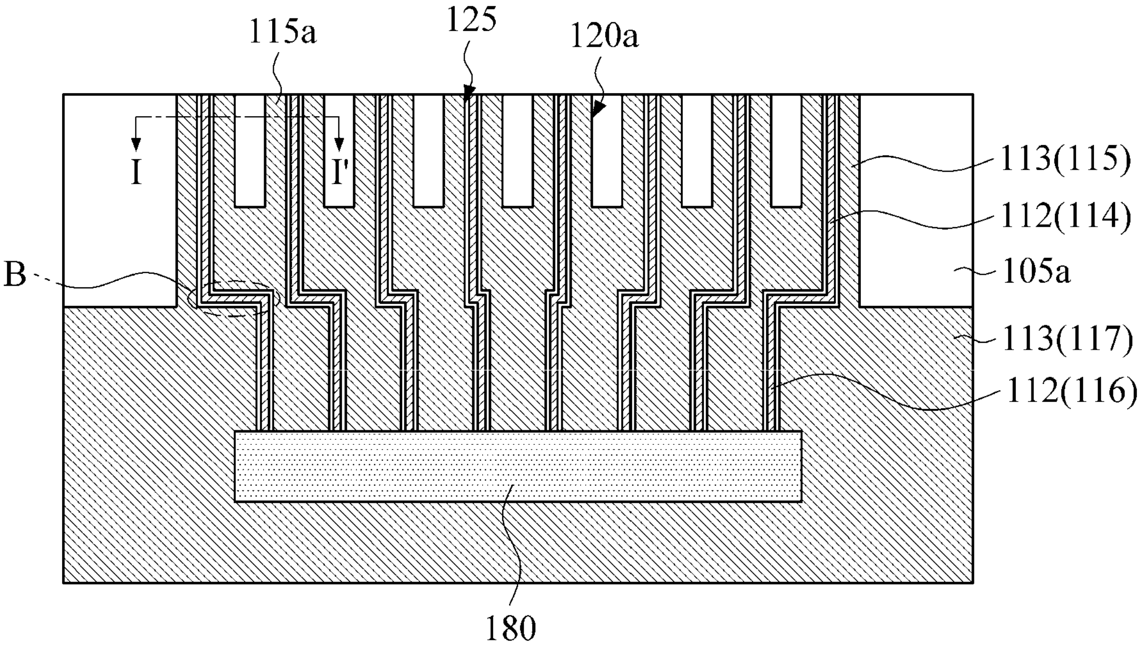
FIGS. 6 and 7 are schematic plan views illustrating a circuit board for an antenna in accordance with exemplary embodiments.
Figure 7:
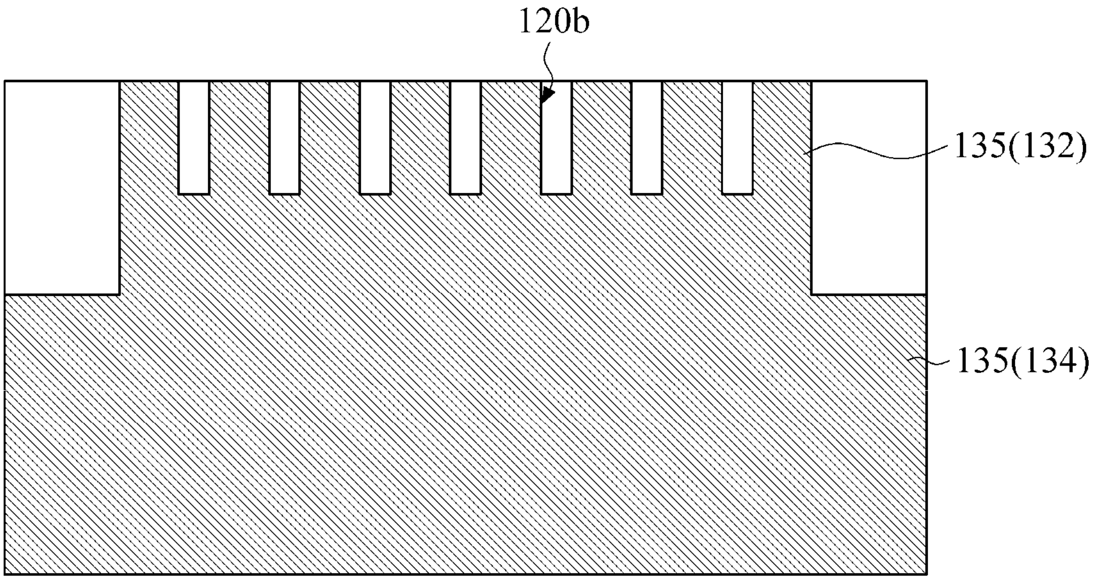
Figure 8:
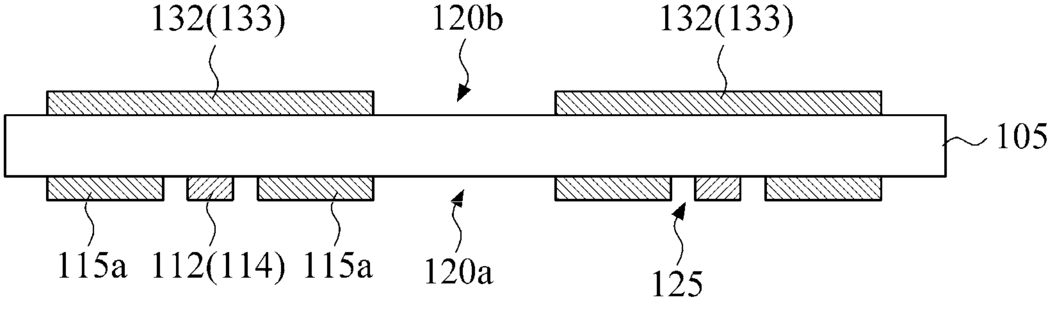
FIG. 8 is a schematic cross-sectional view illustrating a circuit board for an antenna in accordance with exemplary embodiments.

FIG. 5 is a schematic cross-sectional view illustrating a circuit board for an antenna in accordance with exemplary embodiments. FIGS. 6 and 7 are schematic plan views illustrating a circuit board for an antenna in accordance with exemplary embodiments. FIG. 8 is a schematic cross-sectional view illustrating a circuit board for an antenna in accordance with exemplary embodiments.

For example, FIGS. 6 and 7 are plan views from a first surface 105*a* and a second surface 105*b* of the core layer 105, respectively. FIG. 8 is a cross-sectional view taken along a line I-I' of FIG. 6 in the thickness direction. Detailed descriptions on elements and materials substantially the same as or similar to those described with reference to FIGS. 1 to 4 are omitted.

Referring to FIG. 5, as described above, a circuit board 100*a* includes a core layer 105, a first conductive layer 110 formed on the first surface 105a of the core layer 105, and a second conductive layer 135 formed on the second surface 105b of the core layer 105.

Referring to FIG. 6, the first conductive layer 110 having substantially the same structure and construction as described with reference to FIG. 2 may be disposed on the first surface 105a of the core layer 105.

Referring to FIG. 7, the second conductive layer 135 formed on the second surface 105b of the core layer 105 may substantially entirely cover the first conductive layer 110. In exemplary embodiments, the second conductive layer 135 may include a third portion 132 and a fourth portion 134.

The third portion 132 of the second conductive layer 135 may cover the first portion 115 of the co-planar ground 113 and the feeding portions 114 of the signal wirings 112 in a plan view. The fourth portion 134 of the second conductive layer 135 may cover the second portion 117 of the co-planar ground 113 and the external circuit connecting portions 116 of the signal wirings 112 in the plan view.

In exemplary embodiments, each of the first and second conductive layers 110 and 135 may include a recess. As described above, first recesses 120a may be repeatedly formed in the first portion 115 of the co-planar ground 113 along the width direction to form partial cut grounds 115a.

Second recesses 120b may be formed in the third portion 132 of the second conductive layer 135. The second recesses 120b may be repeatedly arranged in the width direction, and may be formed at positions corresponding to the first recesses 120a in the plan view. For example, the first recesses 120a may be superimposed on the second recesses 120b in the thickness direction.

Accordingly, the third portion 132 of the second conductive layer 135 may have a shape substantially similar to that of the first portion 115 of the co-planar ground 113, and may provide a vertical ground function to the feeding portions 114. Further, an amount of the conductive layer or the conductive material in the bonding region may be reduced by the second recess 120b, so that a mutual coupling between the conductive layers and an electric field interference caused by the mutual coupling may be reduced or suppressed.

Referring to FIG. 8, the third portion 132 of the second conductive layer 135 may have a shape partially cut by the second recess 120b. Accordingly, the third portion 132 may include partial cut vertical grounds 133.

In some embodiments, a width of the first recess 120a may be substantially the same as that of a second recess 120b. The width of the partial cut vertical ground 133 may be substantially equal to a sum of a width of the signal wiring 112, widths of the isolation regions 125 around the signal wiring 112, and widths of the partial cut grounds 115a around the signal wiring 112.

Figure 9:
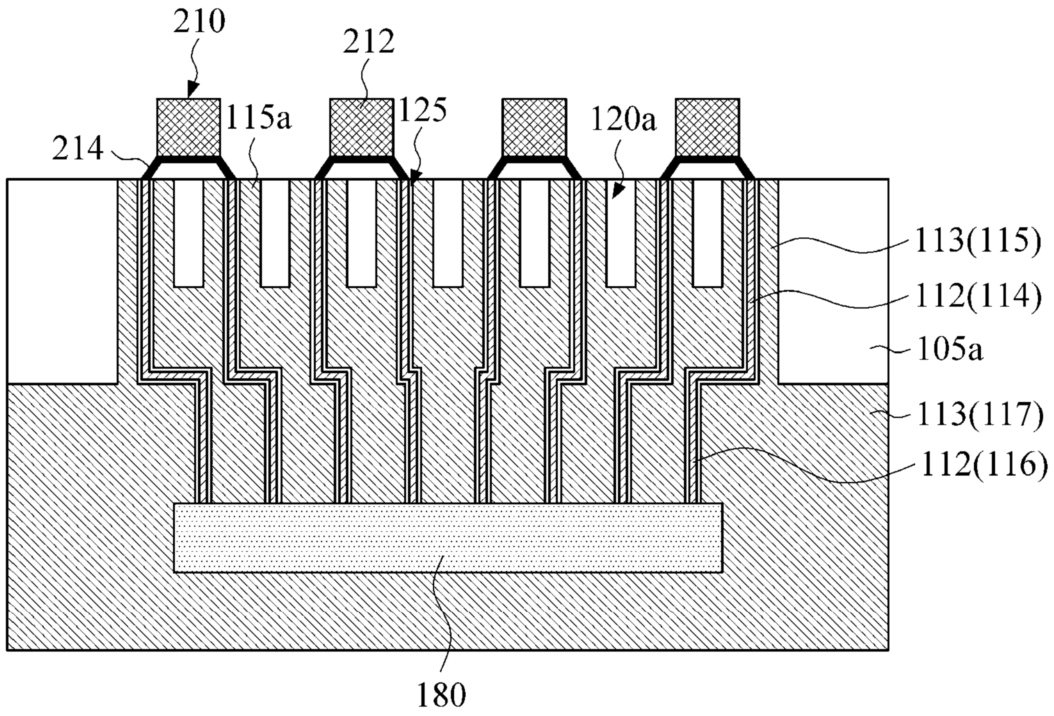
FIG. 9 is a schematic plan view illustrating an antenna package in accordance with exemplary embodiments.
Figure 10:
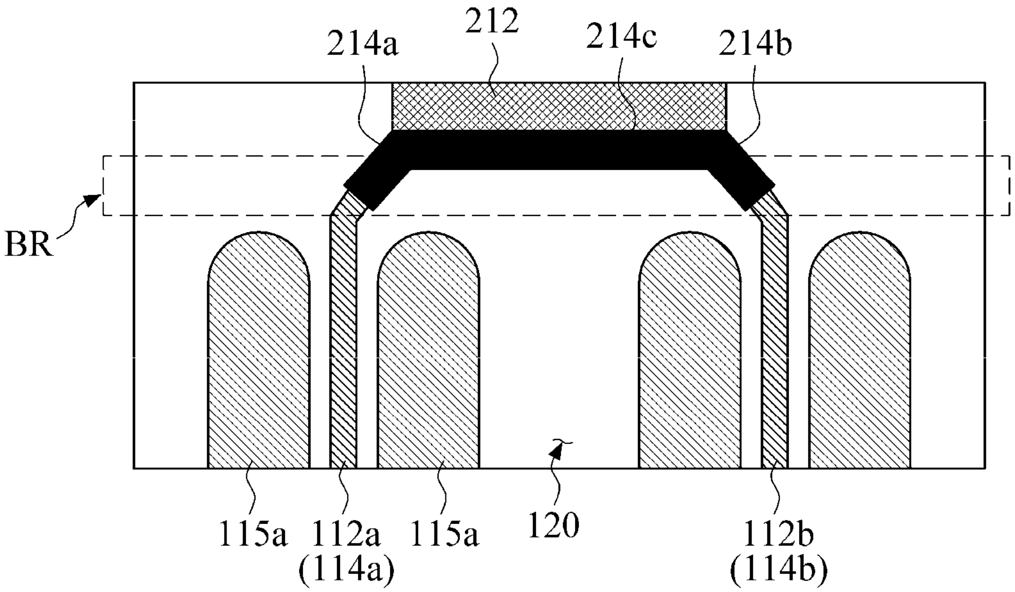
FIG. 10 is a schematic plan view illustrating an antenna package in accordance with exemplary embodiments.

FIG. 9 is a schematic plan view illustrating an antenna package in accordance with exemplary embodiments. FIG. 10 is a schematic plan view illustrating an antenna package in accordance with exemplary embodiments. For example, FIG. 10 is a partially enlarged plan view illustrating a combined structure with one antenna unit 210 around a bonding region.

Referring to FIGS. 9 and 10, the antenna package may include the above-described circuit board and an antenna device bonded or coupled to the circuit board. The antenna device may include a plurality of antenna units 210

The antenna unit 210 may include a radiator 212 and a transmission line 214. In some embodiments, the radiator 212 may have a polygonal plate shape, and may have a mesh structure. Accordingly, the radiator 212 may have improved transmittance and may be disposed within a display area of an image display device.

The transmission line 214 may be integrally connected to the radiator 212 and may be electrically connected to the feeding portion 114 of the signal wiring 112 of the circuit board 100. In some embodiments, an end portion of the transmission line 214 and the feeding portion 114 of the signal wiring 112 may be bonded to each other using an anisotropic conductive film (ACF).

As illustrated in FIG. 10, in some embodiments, the transmission line 214 may include a first branch portion 214a and a second branch portion 214b. For example, the first branch portion 214a and the second branch portion 214b may each extend from both corner portions of a bottom of the radiator 212. The first branch portion 214a and the second branch portion 214b may be substantially symmetrical with respect to a central line of the radiator 210.

In some embodiments, the transmission line 214 may further include a connecting body 214c. For example, the first branch portion 214a and the second branch portion 214b may be electrically connected to each other by the connecting body 214c.

The connecting body 214c may contact a lower side of the radiator 212. In some embodiments, the connecting body 214c, the first branch portion 214a and the second branch portion 214b may be an entirely solid line formed of a metal or an alloy.

The transmission line 214 may be disposed at least partially in a bezel area or a non-display area of the image display device. Accordingly, the transmission line 214 may be formed as a solid line without being visually recognized by a user, thereby providing a reduced resistance and an increased signal speed.

In exemplary embodiments, the antenna unit 210 or the radiator 212 may be designed to transmit and receive signals in a high frequency or ultra-high frequency (e.g., 3G, 4G, 5G or higher) band. For example, a resonance frequency of the antenna unit 210 or the radiator 212 may be 10 GHz or more, from 10 GHz to 40 GHz, preferably from 20 GHz to 40 GHz. As a non-limiting example, the resonance frequency of the antenna unit 210 may be about 28 GHz or more, about 35 GHz or more, or from 36 GHz to 40 GHz.

The antenna unit 210 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in a combination of two or more therefrom.

In an embodiment, the antenna unit 210 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the antenna unit 210 or the radiator 212 may include a transparent conductive oxide such as indium tin oxide (ITO), indium zinc oxide (IZO), zinc oxide (ZnOx), indium zinc tin oxide (IZTO), etc.

In some embodiments, the antenna unit 210 or the radiator 212 may include a stacked structure of a transparent conductive oxide layer and a metal layer. For example, the antenna unit may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

The radiator 212 may include a blackened portion, so that a reflectance at a surface of the antenna unit 212 may be decreased to suppress a visual recognition of the antenna unit due to a light reflectance.

In an embodiment, a surface of the metal layer included in the antenna unit 210 may be converted into a metal oxide or a metal sulfide to form a blackened layer. In an embodiment, a blackened layer such as a black material coating layer or a plating layer may be formed on the antenna unit 210 or the metal layer. The black material or plating layer may include silicon, carbon, copper, molybdenum, tin, chromium, molybdenum, nickel, cobalt, or an oxide, sulfide or alloy containing at least one therefrom.

A composition and a thickness of the blackened layer may be adjusted in consideration of a reflectance reduction effect and an antenna radiation property.

In some embodiments, a dummy mesh electrode (not illustrated) may be formed around the radiator 212.

As illustrated in FIG. 10, the signal wiring 112 included in the circuit board 100 may include a first signal wiring 112*a* and a second signal wiring 112*b*. The first signal wiring 112*a* may include a first feeding portion 114*a*, and the second signal wiring 112*b* may include a second feeding portion 114*b*.

The first signal wire 112*a* and the second signal wire 112*b* may be bonded to the first branch portion 214*a* and the second branch portion 214*b* of one antenna unit 210, respectively. For example, an end portion of the first feeding portion 114*a* may be bonded to the first branch portion 214*a*, and an end portion of the second feeding portion 114*b* may be bonded to the second branch portion 214*b*.

Feeding or phase signals may be transmitted in different directions to one radiator 212 through the first signal wiring 112*a* and the second signal wiring 112*b*. Accordingly, multiple polarization (e.g., dual polarization) properties may be implemented from the single radiator 212.

In some embodiments, the end portions of the first feeding portion 114*a* and the second feeding portion 114*b* may be bent toward the first branch portion 214*a* and the second branch portion 214*b*, respectively.

For example, a plurality of the antenna units 210 may be repeatedly arranged along the width direction, and the first signal wiring 112*a* and the second signal wiring 112*b* may be alternately and repeatedly along the width direction in the circuit board 100.

As illustrated in FIG. 10, in some embodiments, an end portion of the partial cut ground 115*a* may have a curved shape. Accordingly, the amount of the conductive layer or conductive material in the bonding region may be further reduced, and a ground effect at the bent end portion of the feeding portion 114 may be enhanced.

For example, the partial cut ground 115*a* may not extend over the bonding region (indicated by a dotted line rectangle) of the antenna unit 210 and the signal wiring 112 in the plan view.

Figure 11:
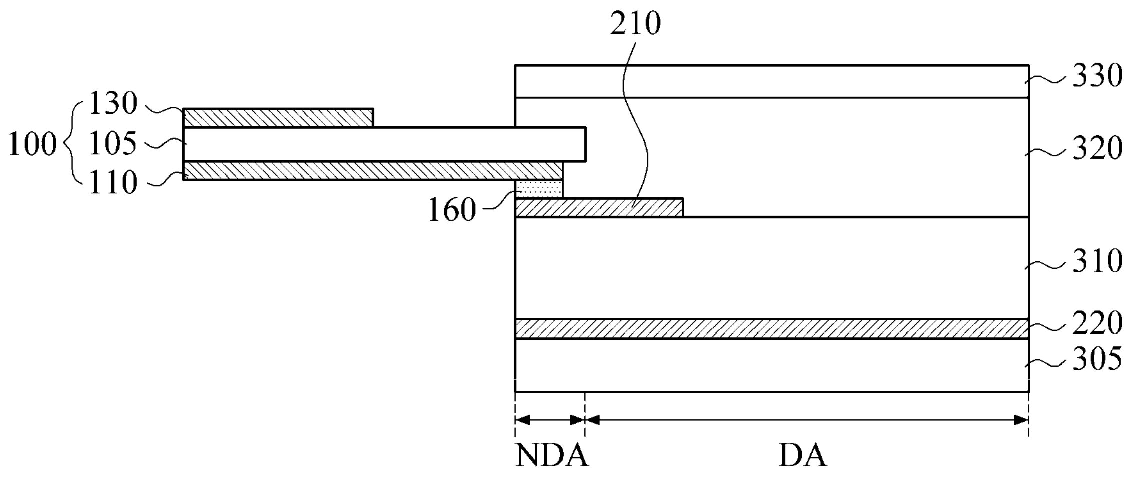
FIG. 11 is a schematic cross-sectional view illustrating an image display device including an antenna package in accordance with exemplary embodiments.
Figure 12:
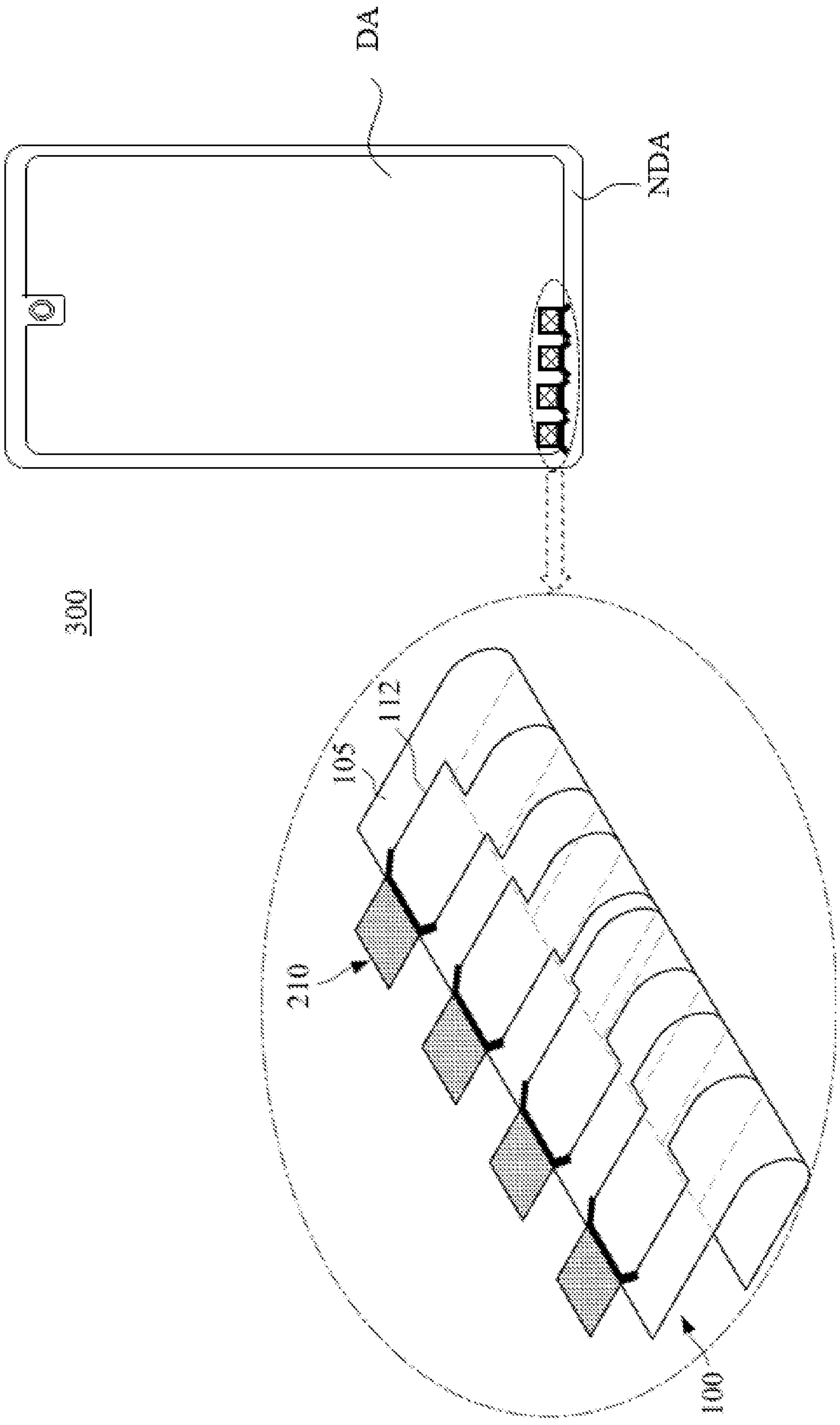
FIG. 12 is a schematic plan view illustrating an image display device including an antenna package in accordance with exemplary embodiments.

FIG. 11 is a schematic cross-sectional view illustrating an image display device including an antenna package in accordance with exemplary embodiments. FIG. 12 is a schematic plan view illustrating an image display device including an antenna package in accordance with exemplary embodiments.

For example, FIG. 12 shows a front portion or a window face of an image display device implemented in the form of a smart phone. For convenience of descriptions, the signal wiring 112 is only illustrated in FIG. 12 among the conductive layers 110 and 130 of the circuit board.

Referring to FIGS. 11 and 12, the image display device 300 may include a display area DA and a non-display area NDA. The non-display area NDA may be disposed at both ends or both sides of the display area DA, and may include a peripheral portion of the image display device 300.

For example, the non-display area NDA may include a bezel area, and may include the bonding region BR of an antenna package (see FIG. 10).

The image display device 300 may include a display panel 305, and an antenna package in which the antenna device including the antenna unit 210 and the circuit board 100 are combined may be disposed on the display panel 305.

The display panel 305 may include a TFT array substrate and a pixel structure including an OLED display layer or a liquid crystal display layer on the TFT array substrate.

A first dielectric layer 310 may be stacked on the display panel 305. The first dielectric layer 310 may be included as, e.g., an antenna dielectric layer for driving the antenna unit 210.

The first dielectric layer 310 may include, e.g., a transparent resin material. For example, the first dielectric layer 310 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbomene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more therefrom.

In some embodiments, an adhesive film such as an optically clear adhesive (OCA) or an optically clear resin (OCR) may be included in the first dielectric layer 310.

In some embodiments, the first dielectric layer 310 may include an inorganic insulating material such as silicon oxide, silicon nitride, silicon oxynitride, glass, etc.

In an embodiment, the first dielectric layer 310 may be provided as a substantially single layer. In an embodiment, the first dielectric layer 310 may include a multi-layered structure of at least two or more layers.

In some embodiments, a dielectric constant of the first dielectric layer 310 may be adjusted in a range from about 1.5 to about 12. When the dielectric constant exceeds about 12, driving in a desired high or ultra-high frequency band may not be implemented due to an excessively reduced driving frequency.

In some embodiments, an antenna ground layer 220 overlapping the antenna unit 210 in a thickness direction may be disposed on a bottom surface of the first dielectric layer 310. A vertical radiation from the radiator 212 toward the front portion of the image display device 300 may be substantially implemented by the antenna ground layer 220.

The antenna ground layer 220 may include a metal and/or an alloy described above. In some embodiments, the antenna device may be defined by the antenna ground layer 220, the first dielectric layer 310 and the antenna unit 210.

In some embodiments, a conductive member of the image display device 300 to which the antenna package is applied may serve as the antenna ground layer 220.

The conductive member may include, e.g., a gate electrode of a thin film transistor (TFT) included in a display panel, various wirings such as a scan line or a data line, or various electrodes such as a pixel electrode or a common electrode.

In an embodiment, various structures including a conductive material disposed under the display panel 305 may serve as the antenna ground layer. For example, a metallic plate (e.g., a stainless steel plate such as a SUS plate), a pressure sensor, a fingerprint sensor, an electromagnetic wave shielding layer, a heat dissipation sheet, a digitizer, etc., may serve as the antenna ground layer.

The circuit board 100 may be electrically connected to the antenna unit 210 through a conductive intermediate structure 160. The conductive intermediate structure 160 may include an anisotropic conductive film (ACF).

For example, the conductive intermediate structure 160 may be attached to the branch portions **214*a* and 214*b* of the antenna units 210** on the bonding region BR.

Thereafter, end portions of the feeding portions **114*a* and 114*b* of the circuit board 100 may be aligned on the conductive intermediate structure 160, and the circuit board 100 and the antenna units 210** may be coupled by a heat compression.

The image display device 300 or the antenna device may include a second dielectric layer 320 covering the antenna unit 210. The second dielectric layer 320 may also cover the circuit board 100 in the bonding region BR.

A cover window 330 may be disposed on the second dielectric layer 320. The cover window 330 may include a hard coating film or glass (e.g., UTG).

As illustrated in FIG. 12, a rear end portion of the circuit board 100 of the antenna package may be bent and electrically connected to an antenna driving IC chip disposed under the display panel 305.

For example, the rear end portion of the circuit board 100 where the second portion 117 of the co-planar ground 113 and the external circuit connecting portion 116 of the signal wiring 112 are disposed may be bent under the display panel 305. The antenna driving IC chip may be mounted on a chip mounting substrate (e.g., a main board or a rigid PCB) and may be electrically connected to the circuit board 100 and the antenna unit 210 by the connector 180.

As illustrated in FIG. 12, the radiator 212 may have a mesh structure and may be disposed to be adjacent to the non-display area NDA or the bonding region BR. Accordingly, gain and frequency properties of the radiator 212 may be degraded by a coupling between the conductive layer included in the circuit board 100 and the conductive structure included in the antenna device or the display panel 305 generated in the bonding region BR.

However, according to the exemplary embodiments described above, the area of the first and second conductive layers 110 and 130 disposed in the bonding region BR may be reduced, so that a signal efficiency transmitted to the antenna unit 210 may be improved. The coupling may be suppressed while implementing grounding properties. Additionally, noises and coupling around the radiator 212 may be removed or reduced, so that a frequency range (bandwidth) capable of maintaining a high antenna gain may be increased.

What is claimed is:

1. A circuit board for an antenna, comprising:
- a core layer having a first surface and second surface that face each other;
- a second conductive layer disposed on the second surface of the core layer; and
- a first conductive layer disposed on the first surface of the core layer, the first conductive layer comprising:
  - signal wirings; and
  - a co-planar ground spaced apart from the signal wirings in a horizontal direction, the co-planar ground comprising a first recess formed between end portions of neighboring signal wirings of the signal wirings,
- wherein the co-planar ground comprises a first portion adjacent to front end portions of the signal wirings serving as feeding portions and a second portion adjacent to rear end portions of the signal wirings serving as external circuit connection portions, and the first recess is only formed in the first portion.

2. The circuit board for an antenna of claim 1, wherein the first portion comprises partial cut grounds divided by the first recess.

3. The circuit board for an antenna of claim 2, wherein a length of each of the partial cut grounds is equal to or greater than half a wavelength of a resonance frequency.

4. The circuit board for an antenna of claim 2, wherein a ratio of a width of the signal wiring to a width of the partial cut ground is in a range from 3 to 5.

5. The circuit board for an antenna of claim 2, further comprising a connector connected to the external circuit connection portions.

6. The circuit board for an antenna of claim 2, wherein the second conductive layer overlaps the second portion of the co-planar ground in a thickness direction and does not overlap the first portion of the co-planar ground.

7. The circuit board for an antenna of claim 6, wherein the second conductive layer overlaps the rear end portions of the signal wirings in the thickness direction and does not overlap the front end portions of the signal wirings.

8. The circuit board for an antenna of claim 2, wherein the second conductive layer comprises a third portion overlapping the first portion of the co-planar ground, and a fourth portion overlapping the second portion of the co-planar ground.

9. The circuit board for an antenna of claim 8, wherein the third portion of the second conductive layer has a second recess overlapping the first recess in a plan view.

10. The circuit board for an antenna of claim 8, wherein the second conductive layer entirely covers the signal wirings in a plan view.

11. The circuit board for an antenna of claim 2, wherein the signal wirings have bent portions connecting the front end portions and the rear end portions.

12. The circuit board for an antenna of claim 2, wherein end portions of the partial cut grounds have a curved shape.

13. An antenna package comprising:
- a plurality of antenna units each comprising a radiator and a transmission line connected to the radiator; and
- the circuit board for an antenna of claim 1 electrically connected to the antenna units.

14. The antenna package of claim 13, wherein the transmission line comprises a first branch portion and a second branch portion extending in different directions from the radiator, and the signal wirings comprise a first signal wiring electrically connected to the first branch portion, and a second signal wiring electrically connected to the second branch portion.

15. The antenna package of claim 14, wherein the first recess is disposed between the first signal wiring and the second signal wiring.

16. An image display device comprising:

a display panel;

an antenna unit disposed on the display panel; and the circuit board for an antenna of claim 1 electrically connected to the antenna unit.

17. The image display device of claim 16, wherein the circuit board for an antenna is bent under the display panel.

18. A circuit board for an antenna, comprising:

a core layer having a first surface and second surface that face each other;

a second conductive layer disposed on the second surface of the core layer; and a first conductive layer disposed on the first surface of the core layer, the first conductive layer comprising:

signal wirings; and a co-planar ground spaced apart from the signal wirings in a horizontal direction, the co-planar ground comprising a first recess formed between end portions of neighboring signal wirings of the signal wirings, wherein the co-planar ground comprises a first portion adjacent to front end portions of the signal wirings and a second portion adjacent to rear end portions of the signal wirings, and the first portion comprises partial cut grounds divided by the first recess, wherein a length of each of the partial cut grounds is equal to or greater than half a wavelength of a resonance frequency.

19. A circuit board for an antenna, comprising:

a core layer having a first surface and second surface that face each other;

a second conductive layer disposed on the second surface of the core layer; and a first conductive layer disposed on the first surface of the core layer, the first conductive layer comprising:

signal wirings; and a co-planar ground spaced apart from the signal wirings in a horizontal direction, the co-planar ground comprising a first recess formed between end portions of neighboring signal wirings of the signal wirings, wherein the co-planar ground comprises a first portion adjacent to front end portions of the signal wirings and a second portion adjacent to rear end portions of the signal wirings, and the first portion comprises partial cut grounds divided by the first recess, wherein a ratio of a width of the signal wiring to a width of the partial cut ground is in a range from 3 to 5.

* * * * *